United States Patent
Lee et al.

(10) Patent No.: US 11,354,038 B2
(45) Date of Patent: Jun. 7, 2022

(54) PROVIDING RANDOM ACCESS TO VARIABLE-LENGTH DATA

(71) Applicant: International Business Machines Corporation, Armonk, NY (US)

(72) Inventors: Jinho Lee, Travis, TX (US); Frank Liu, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 26 days.

(21) Appl. No.: 16/516,454

(22) Filed: Jul. 19, 2019

(65) Prior Publication Data
US 2021/0019049 A1    Jan. 21, 2021

(51) Int. Cl.
G06F 3/06    (2006.01)

(52) U.S. Cl.
CPC .......... G06F 3/0608 (2013.01); G06F 3/064 (2013.01); *G06F 3/0604* (2013.01); *G06F 3/0659* (2013.01); *G06F 3/0673* (2013.01)

(58) Field of Classification Search
CPC ...... G06F 3/064; G06F 3/0604; G06F 3/0659; G06F 3/0673
See application file for complete search history.

(56) References Cited

U.S. PATENT DOCUMENTS

| | | | |
|---|---|---|---|
| 7,529,905 B2 | 5/2009 | Sinclair | |
| 7,937,528 B2 | 5/2011 | Cousins | |
| 8,880,815 B2* | 11/2014 | Alexandron | G06F 9/3555 711/154 |
| 9,086,973 B2* | 7/2015 | Vorbach | G06F 12/0813 |
| 9,471,500 B2 | 10/2016 | Kruus et al. | |
| 10,095,630 B2 | 10/2018 | Jermar | |
| 2010/0332846 A1 | 12/2010 | Bowden et al. | |
| 2016/0350344 A1* | 12/2016 | Sankar | G06F 16/2237 |
| 2017/0153825 A1* | 6/2017 | Cho | G11C 8/18 |
| 2018/0136869 A1* | 5/2018 | Mola | G06F 11/30 |

FOREIGN PATENT DOCUMENTS

WO    WO-2021009230 A1 *    1/2021 .......... H03M 7/3077

OTHER PUBLICATIONS

Anonymous, "Trie," Wikipedia; Jun. 2017 <URL: https://en.wikipedia.org/wiki/Trie> (7 pages).

(Continued)

*Primary Examiner* — William E. Baughman
*Assistant Examiner* — Janice M. Girouard
(74) *Attorney, Agent, or Firm* — Cantor Colburn LLP; Brian Welle

(57) ABSTRACT

Aspects of the present disclosure provide a computer-implemented method that includes providing a layered index to variable length data, the layered index comprising a plurality of layers. Each layer of the plurality of layers has an index array, a block offset array, and a per-block size array. The index array identifies a next level index of a plurality of indices or data. The indices represent a delta value from a first index of a block. The block offset array identifies a starting location of the index array. The per-block array identifies a shared integer size of a block of indices. The method further includes performing a random access read of the variable length data using the layered index.

17 Claims, 8 Drawing Sheets

(56) References Cited

OTHER PUBLICATIONS

Erway, et al. "Dynamic Provable Data Possession." ACM Transactions on Information and System Security (TISSEC); Nov. 9-13, 2009; pp. 213-222.
Lim et al. "SILT: A Memory-Efficient, High-Performance Key-Value Store" Proceedings of the 23rd ACM Symposium on Operating Systems Principles. ACM, Oct. 23-26, 2011, pp. 1-13.
Wu et al., "Analyses of Multi-Level and Multi-Component Compressed Bitmap Indexes" ACM Transactions on Database Systems (TODS) vol. 35, Issue 1, Article No. 2, Feb. 2010 (52 pages).

* cited by examiner

PROVIDING RANDOM ACCESS TO VARIABLE-LENGTH DATA

BACKGROUND

The present invention generally relates to computer processing systems, and more specifically, to providing random access to variable-length data.

Computer processing systems store data, such as in a memory or other storage device. Data can be stored in different ways and in different sizes. For example, data can be stored as fixed-length entries. As another example, data can be stored as variable-length entries.

SUMMARY

Embodiments of the present invention are directed to providing random access to variable-length data.

A non-limiting example computer-implemented method includes providing a layered index to variable length data, the layered index comprising a plurality of layers. Each layer of the plurality of layers has an index array, a block offset array, and a per-block size array. The index array identifies a next level index of a plurality of indices or data. The indices represent a delta value from a first index of a block. The block offset array identifies a starting location of the index array. The per-block array identifies a shared integer size of a block of indices. The method further includes performing a random access read of the variable length data using the layered index.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a compressed random access index for variable-length data. For variable-length data, random access storage techniques are costly in terms of data read time. For example, a memory block is read from a start to a target vertex storing the data to be read. While an index can be useful to reduce the overhead costs associated with reading variable-length data, the index can increase the storage space required. For example, the index can additionally consume additional storage in the amount from 20% to 90% of the amount of data. That is, if the variable-length data consumes 4096 bytes, the index could require an additional ~819 bytes (20%) to ~3687 bytes (90%) for storage. This represents a significant storage overhead requirement for using an index.

The above-described aspects of the invention address the shortcomings of the prior art by providing a compressed random access index for variable-length data. This provides a multi-layer structure that provides compression but enables O(1) random access. The present techniques provide a compressed random access index that is partitioned into blocks. Block base indices are recorded, and these indices are represented in a variable length index as a delta (difference) from a block base. The indices can be shrunken to a minimal size, and the size is maintained with the block base value.

More particular, the present techniques provide compressed random access index for variable-length data by providing a layered index to variable length data. The layered index includes a plurality of layers, each layer of the plurality of layers having an index array, a block offset array, and a per-block size array. The index array identifies a next level index of a plurality of indices or data, The indices represent a delta (difference) value from a first index of the plurality of indices with a shared size. The block offset array identifies a starting location of the index array. The per-block array identifies a shared integer size of the block. The present techniques enable performing a random access read of the variable length data using the layered index.

One or more embodiments of the present invention provide technological improvements over current methods of random access data storage that require significant overhead to store an index used for random access. Disadvantages of contemporary approaches include significant overhead and time to access variable length data. Examples such contemporary approaches include naïve indexing (offsets to each data item), block indexing (offsets to each block), delta indexing with variable length index (VLI) (apply the VLI to each offset), and delta indexing with VLI and block synchronization (also store offset to index of each block). These approaches operate with the time and space overhead shown in the following table:

| Approach | Time | Space |
|---|---|---|
| Naïve Indexing | O(1) | O(N) |
| Block Indexing | O(B) | O(N/B) |
| Delta Indexing with VLI | O(N/C) | O(N/C) |
| Delta Indexing with VLI and Block Synchronization | O(B)+ | O(N/C) + O(N/B) |

One or more embodiments of the present invention provide technical solutions to one or more of these disadvantages of existing solutions by improving the time and space overhead of contemporary approaches. For example, the present techniques utilize a time overhead of O(1)+ and a space overhead of O(N/C)+O(N/B). These and other advantages will be apparent from the following description.

Figure 1:
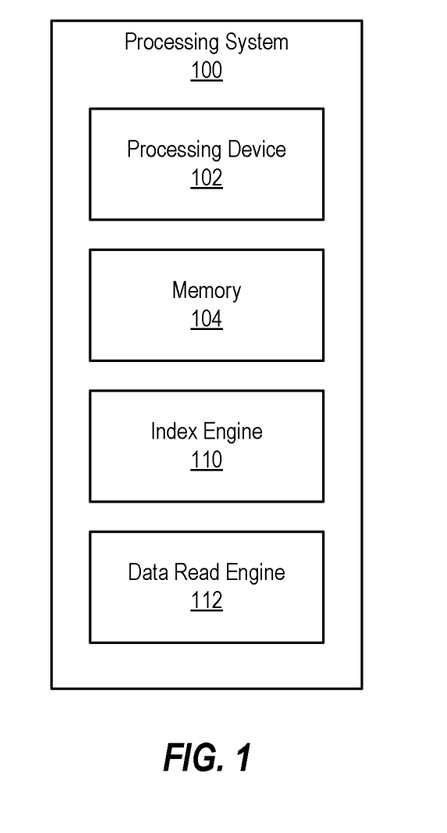
FIG. 1 depicts a block diagram of a processing system for providing random access to variable-length data according to one or more embodiments described herein.

Turning now to FIG. 1, a processing system 100 for a compressed random access index for variable-length data is depicted according to one or more embodiments described herein. The processing system 100 includes a processing device 102 (e.g., the processor 621 of FIG. 6), a memory 104 (e.g., the RAM 624 of FIG. 6), an index engine 110, and a data read engine 112.

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming The programming can be processor executable instructions stored on a tangible memory, and the hardware can include the processing device 102 for executing those instructions. Thus a system memory (e.g., memory 104) can store program instructions that when executed by the processing device 102 implement the engines described herein. Other engines can also be utilized to include other features and functionality described in other examples herein. The features and functionality of the various components, modules, engines, etc. of FIG. 1 are now described with reference to FIG. 2.

Figure 2:
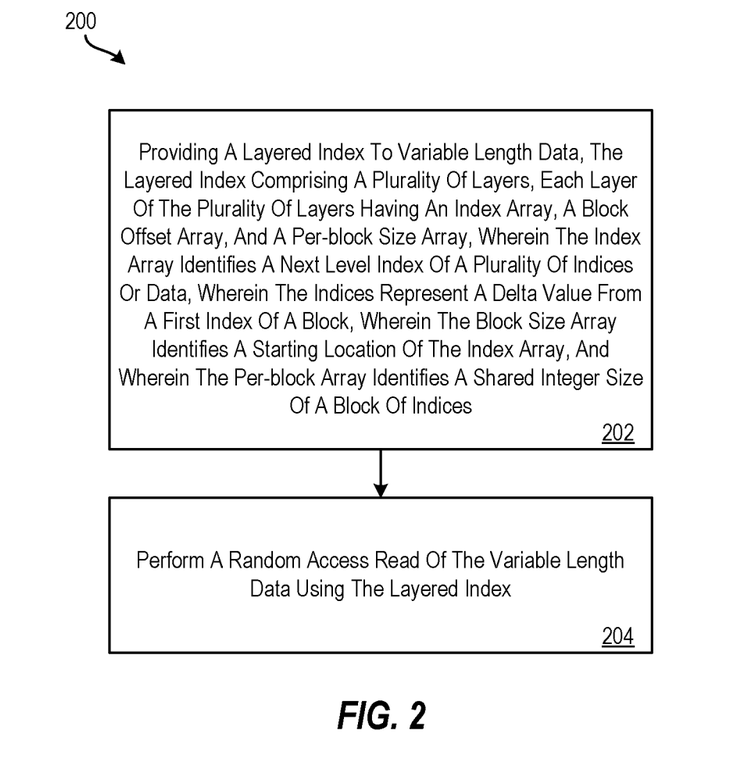
FIG. 2 depicts a flow diagram of a method for providing random access to variable-length data according to one or more embodiments described herein.

In particular, FIG. 2 depicts a flow diagram of a method 200 for providing random access to variable-length data according to one or more embodiments described herein. The method 200 can be implemented by any suitable processing system (e.g., the processing system 100 of FIG. 1, the processing system 600 of FIG. 6, etc.), by any suitable processing device (e.g., the processing device 102 of FIG. 1, the processor 621 of FIG. 6, etc.) or the like, and combinations thereof.

At block 202, the index engine 110 of the processing system 100 provides a layered index to variable length data. The layered index includes a plurality of layers. Each layer of the plurality of layers has an index array, a block offset array, and a per-block size array. The index array identifies a next level index of a plurality of indices or data. The indices represent a delta value from a first index of a block. The block offset array identifies a starting location of the index array. The per-block array identifies a shared integer size of the block.

At block 204, the data read engine 112 of the processing system 100 performs a random access read of the variable length data using the layered index.

Additional processes also may be included, and it should be understood that the process depicted in FIG. 2 represents an illustration, and that other processes may be added or existing processes may be removed, modified, or rearranged without departing from the scope of the present disclosure.

Figure 3A:
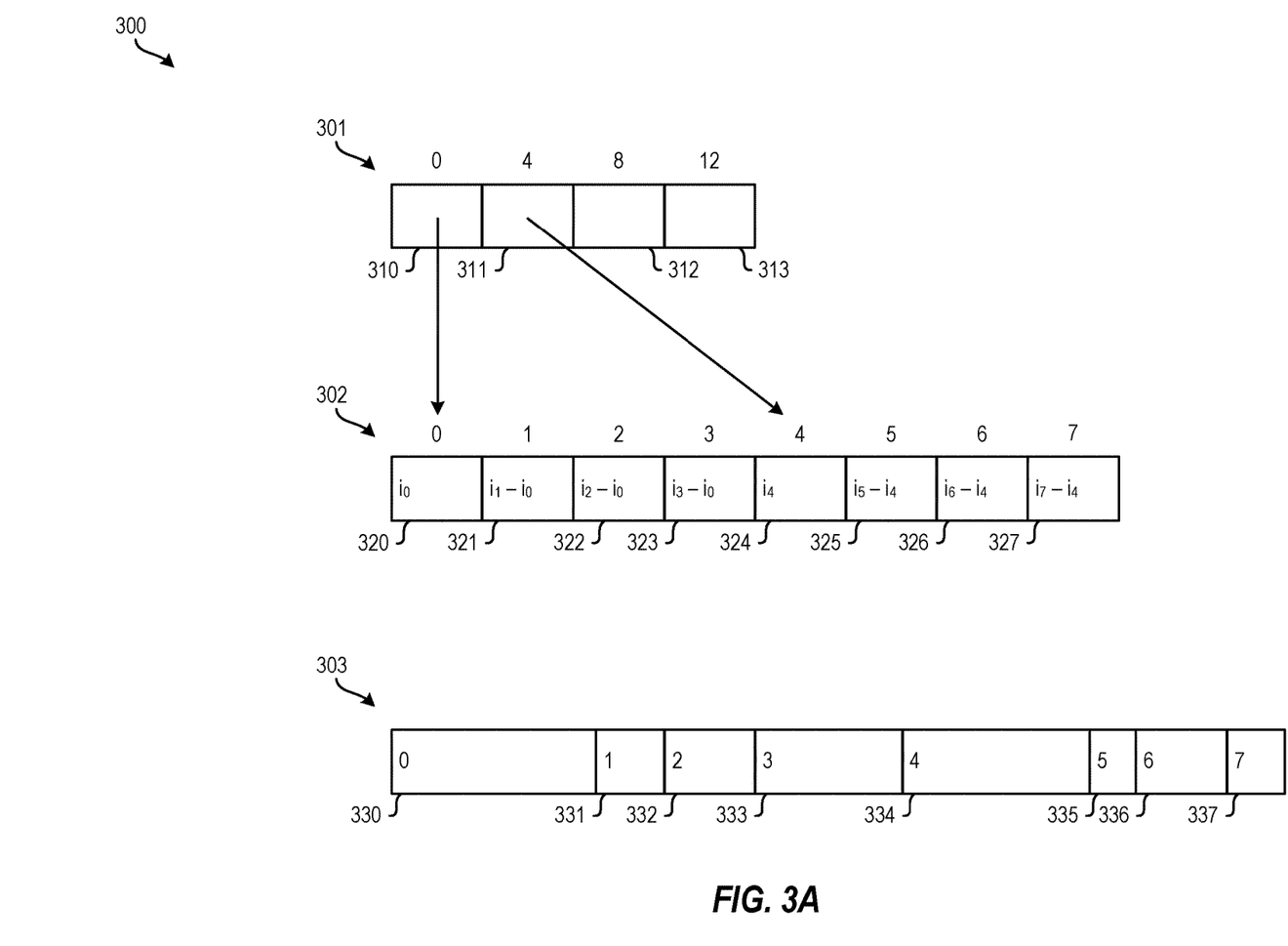
FIGS. 3A and 3B depict a layered index approach for providing random access to variable-length data according to one or more embodiments described herein.
Figure 3B:
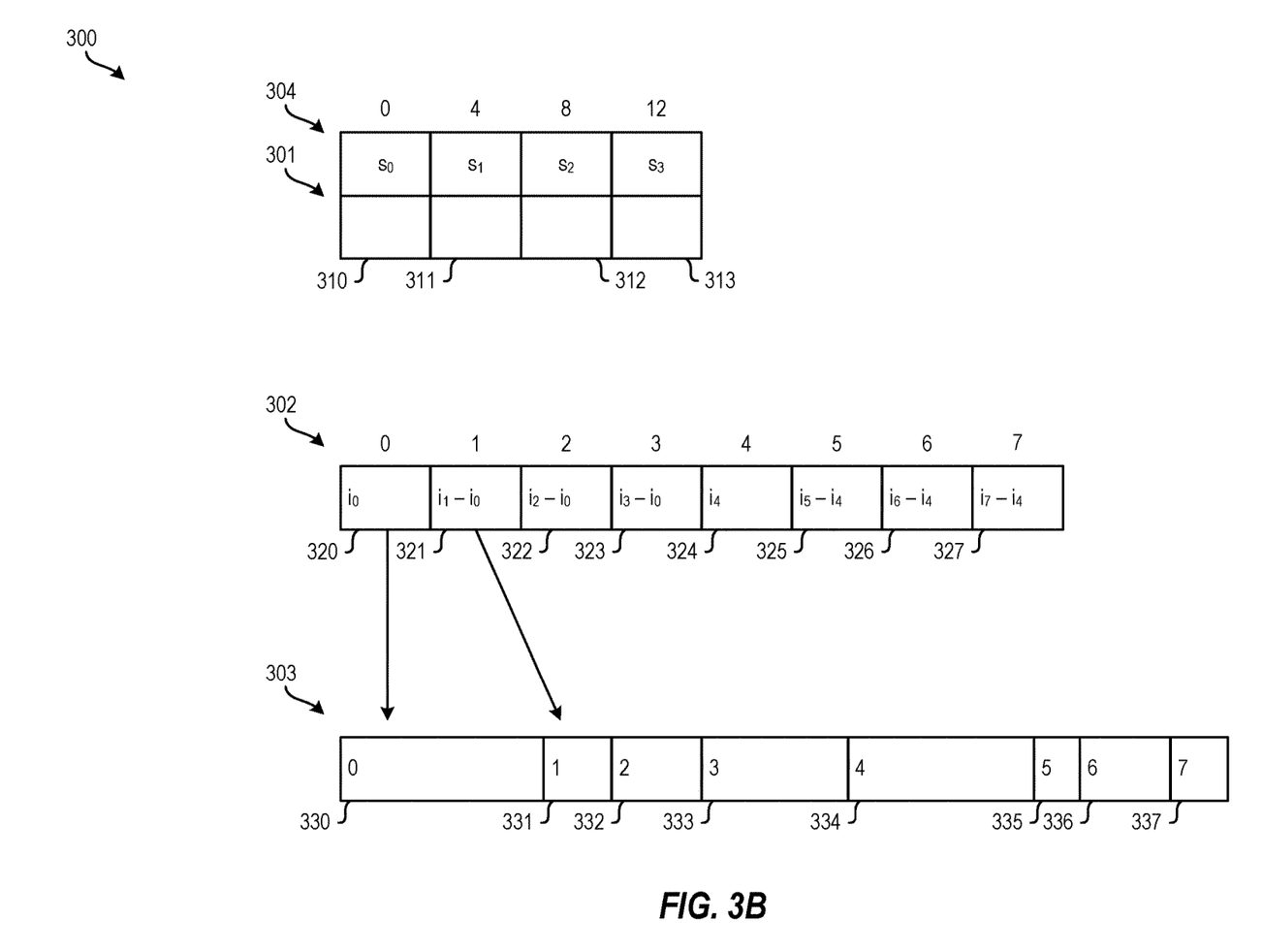

FIGS. 3A and 3B depict a layered index approach 300 for providing random access to variable-length data according to one or more embodiments described herein. As shown in these figures, the layered index approach 300 uses a block offset (i.e., a block offset array) 301, which maps to an index (i.e., an index array) 302, which in turn maps to variable length data 303. When a random access read is performed, the block offset 301 is accessed to determine a location in the index 302. Then, based on the location in the index 302, the variable length data 303 can be accessed at an appropriate location. As shown in FIG. 3B, the layered index approach 300 can also utilize a per-block size array 304.

The block offset 301 defines a block offset size used to divide the index into blocks of the same size (i.e., 4). In the example of the layered index approach 300, the block offset size is 4, although other block offset sizes can be used. In this example, the block offset 301 includes cells 310, 311, 312, 313. Each cell 310-313 points to a first location (i.e, a first index) of an associated block of the index 302. For example, the cell 310 points to a first location a first block of the index 302 at cell 320, the cell 311 points to a first location of a second block of the index 302 at cell 324, etc.

The index 302 is a base-delta index, where indices are relative to the first index in the block, which removes serial dependencies. The index 302 includes cells 320, 321, 322, 323, 324, 325, 326, 327 having the respective values shown in FIGS. 3A and 3B For example, cell 320 has a value $i_0$, the cell 321 has a value $i_1-i_0$, etc. The values of the cells 321-327 are "delta values," which represent a difference between a value of a first index and a shared size. For example, the value of the cell 321 is a delta value of $i_1-i_0$, which represents the difference from the value of the cell 320 and a shared size (i.e., the block offset value stored in the cell 310 (i.e., 4)). Similarly, the value of the cell 322 is a delta value of $i_2-i_0$, which represents the difference from the value of the cell 320 and a shared size (i.e., the block offset value stored in the cell 310 (i.e., 4)). Because a block offset of 4 is utilized in the present example, the first four cells (i.e., the cells 320-323) of the index 302 form a first block. Similarly, the next four cells (e.g., the cells 324-327) of the index 302 form a second block. The values of the cells 324-327 are based on a delta value from the index value of cell 324, indicated by the block offset of cell 311.

The values of the cells 320-327 can be encoded using variable length index encoded. In such cases, the value is rounded up to a constant bit-length. The constant bit-length is constant for a particular block but can vary across other blocks. As an example, the bit-length s is determined as $\log(i_3-i_0)$.

The per-block size array 304 records the shared index size next to the block offset 301. This value is used to locate an index within a block of the index 302 that has been compressed using encoding techniques. For example, variable length index encoding can be applied on a per-block basis of the index 302 to compress the delta values stored in the index 302.

The values of the cells 320-327 point to the starting location of the variable length data 303. The starting location is denoted as a first byte of a corresponding cell of the cells 330, 331, 332, 333, 334, 335, 336, 337 of the variable length data 303.

Figure 4A:
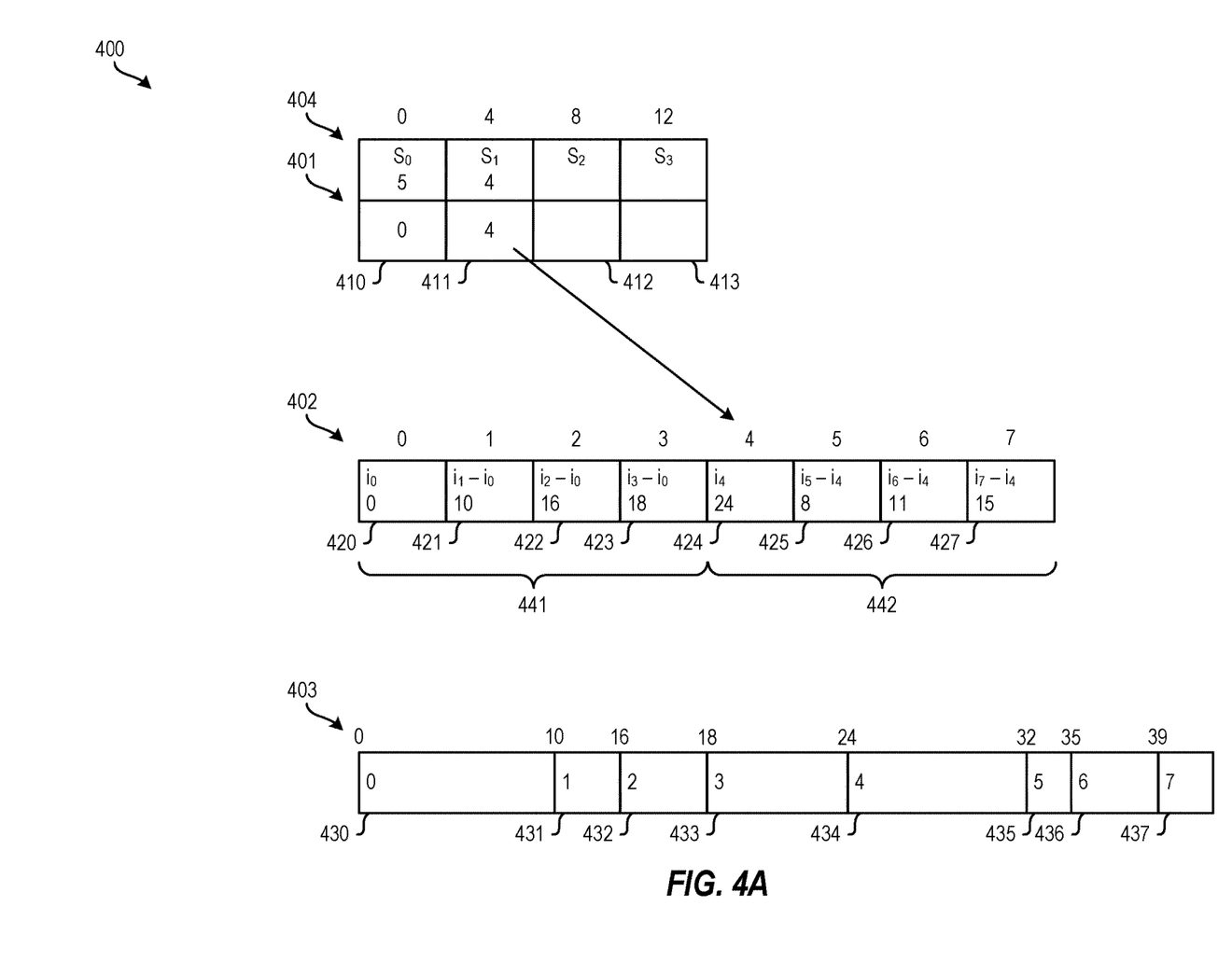
FIGS. 4A and 4B depict a particular example of the layered index approach for providing random access to variable-length data of FIGS. 3A and 3B according to one or more embodiments described herein.
Figure 4B:
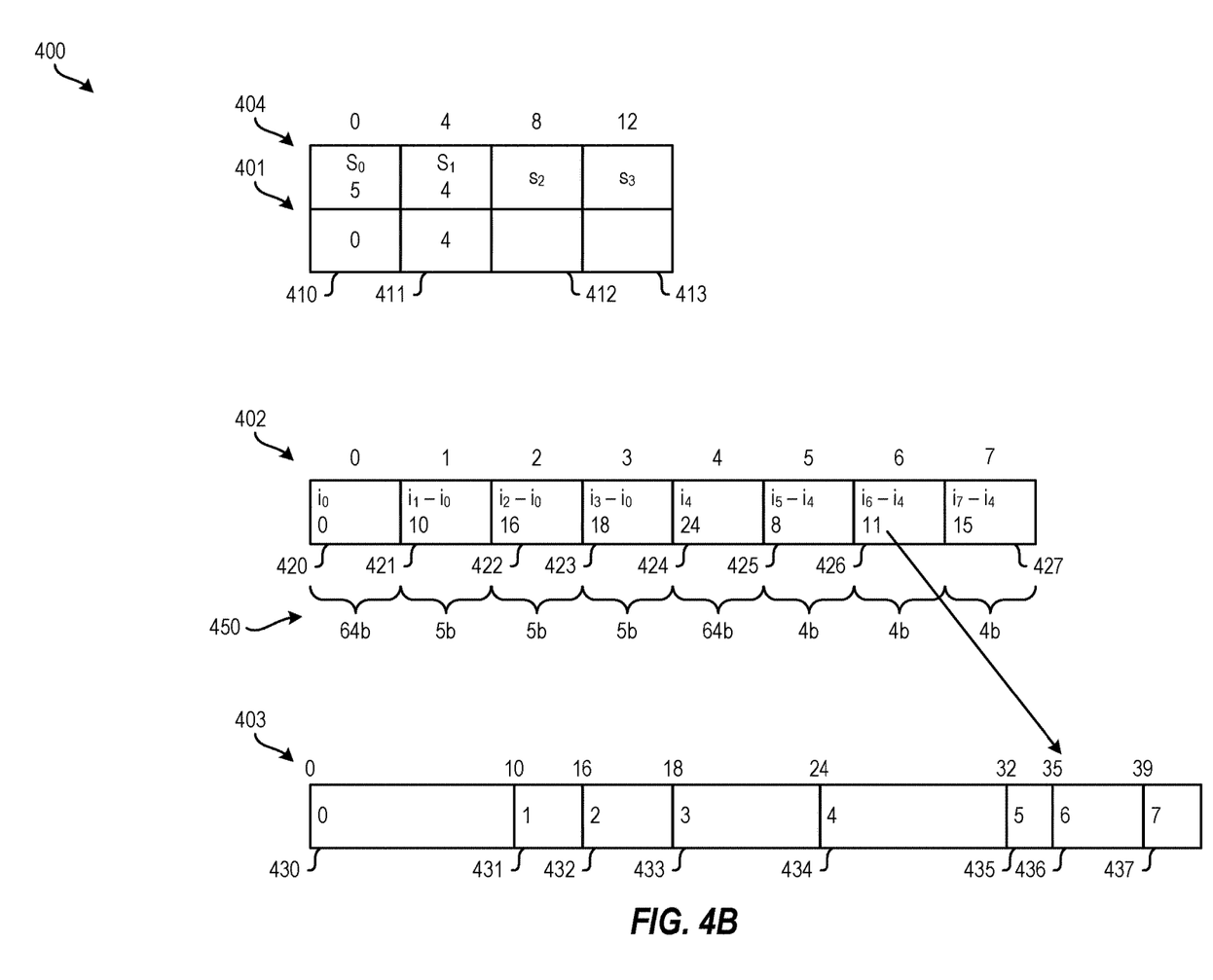

The layered index approach 300 is shown and described in more detail with reference to the example of FIGS. 4A and 4B. In particular, FIGS. 4A and 4B depict a particular example 400 of the layered index approach 300 for providing random access to variable-length data of FIGS. 3A and 3B according to one or more embodiments described herein.

Like FIGS. 3A and 3B, the example of the layered index approach 400 includes a block offset 401 that includes cells 410, 411, 412, 413. Each cell 410-413 of the block offset 401 points to a first location of an associated block of the index 402. For example, the cell 410 points to a first location a first block 441 of the index 402 at cell 420, the cell 411 points to a first location of a second block 442 of the index 402 at cell 424, etc.

The index 402 stores indices relative to the first index in that block. For example, the index 402 stores indices (shown as cells 420-423) for the block 441 relative to the first location (i.e., the cell 420) of the first block 441. Similarly, the index 402 stores indices (shown as cells 424-427) relative to the first location (i.e., the cell 424) of the second block 442. For example, the cell 420 (the first location of the first block 441) stores the value "0," indicating that it references byte "0" of the variable length data 403. The remaining cells (i.e., the cells 421, 422, 423) of the first block 441 of the index 402 store delta values relative to the first location of the first block 441 (i.e., the cell 420). Accordingly, cell 421 stores the value "10" which represents a difference between the value of the cell 420 and the starting point of the cell 431 of the variable length data 403. Similarly, cell 421 stores the value "16" which represents a different between the value of the cell 420 and the starting point of the cell 432 of the variable length data 403, and cell 423 stores the value "18" which represents a different between the value of the cell 420 and the starting point of the cell 433 of the variable length data 403. This completes block 441 because the block size in this example is 4.

The second block 442 stores values similarly, with reference to the first location (i.e., cell 424) of the second block 442. Thus, the first location (i.e., cell 424) of the second block 442 stores the value "24," indicating that it references byte "24) of the variable length data 403 (i.e., the cell 434). The remaining cells (i.e., the cells 425, 426, 427) of the second block 442 of the index 402 store delta values relate to the first location of the second block 442 (i.e., the cell 424). In this example, the cells 425, 426, 427 store the values "8," "11," and "15" respectively based on the difference between the value of the associated cells 435, 436, 437 of the variable length data 403 to the value of the first location (i.e., cell 424) of the second block 442.

Further, it is possible to compress the values of the cells of the index 402 on a per-block basis. Consider the first block 441, which stores the values "0," "10," "16," and "18" respectively in cells 420-423. These values can be compressed depending on how they can be represented in binary. The first location of the first block 441 (i.e., the cell 420) is expressed as a 64-bit value by default (although other values can be utilized in other examples). The values of the remaining cells 421-423 of the first block 441 can be expressed in binary as "01010," "10000," and "10010" respectively. As is evident, these values can be expressed as 5-bit numbers. In other words, the function "ceil(log (max_value)" (i.e., ceil(log(18))) yields the compression value (i.e., "5") for a block (i.e., the first block 441). The "max_value" is the maximum binary bit-length of the values of the cells in the block. Thus, the first block 441 can be compressed to 69 bits, namely 64 bits for the cell 420 and 5 bits for the remaining cells 421-423. Similarly, the compression for the second block 442 is 68 bits (64 bits+(ceil (log(15))=4) bits). The compression value is stored in the per-block size array.

In this example, it is desired to access data "6" (i.e., the cell 426 of the variable length data 403). A block offset of 4 is implemented in this example, although other block sizes can be implemented in other examples. In this case, the block offset 401, which divides the index 402 into blocks of the same size (i.e., 4), is referenced. It can be determined that the desired data "6" is associated with the second block of cell 411 because "6" falls between the maximum of the first block 441 (3) and the maximum of the second block 442 (7). Cell 411 of the block offset 401 points to the second block 442 of the index 402 as shown in FIG. 4A. To determine the location of the variable length data 403, cell 426 of the index 402 is referenced, showing a value of "11." This value can be added to the value of the first location of the second block 442 (i.e., $i_4$=24) to determine the location of the variable length data 403 for the location "6" beginning at byte 35 (i.e., 24+11) of the variable length data 403 as shown in FIG. 4B.

Figure 5:
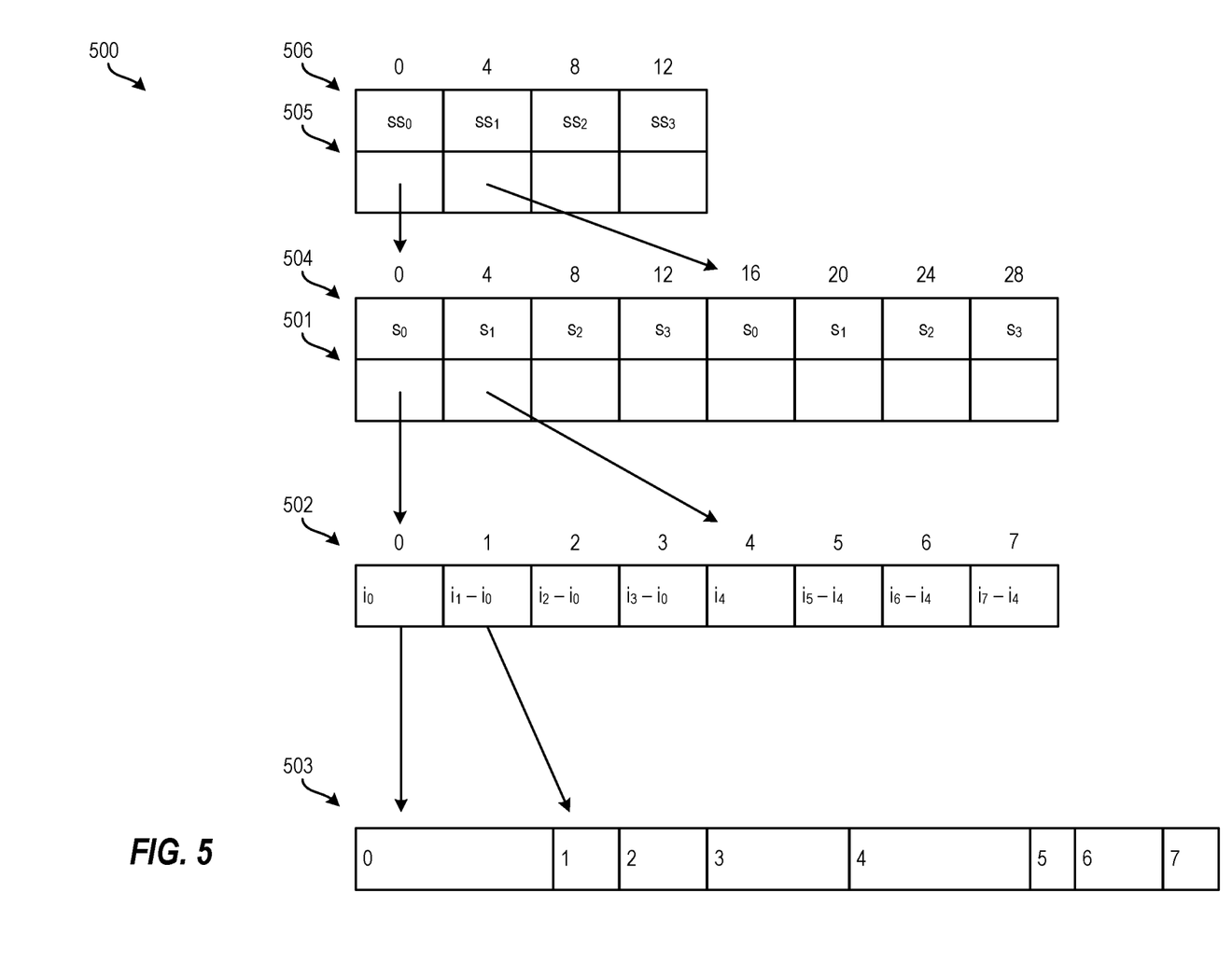
FIG. 5 depicts another layered index approach for providing random access to variable-length data according to one or more embodiments described herein.

FIG. 5 depicts another layered index approach 500 for providing random access to variable-length data according to one or more embodiments described herein. This example includes a block offset 501 with associated per-block size array 504, an index 502, and variable length data 503 However, in addition, this approach 500 provides another layer, which includes a second block offset 506 and an associated per-block size array 506. This additional layer provides additional indexing and compression and references the block offset 501, which in turn uses the index 502 to access the variable length data 503. It should be appreciated that additional layered indexes can be implemented, providing additional improvements to accessing variable length data. Each layer of the layered index uses blocks of fixed size. However, sizes of one layer can differ from block sizes of a different layer, thereby providing differing granularity among the layers.

Figure 6:
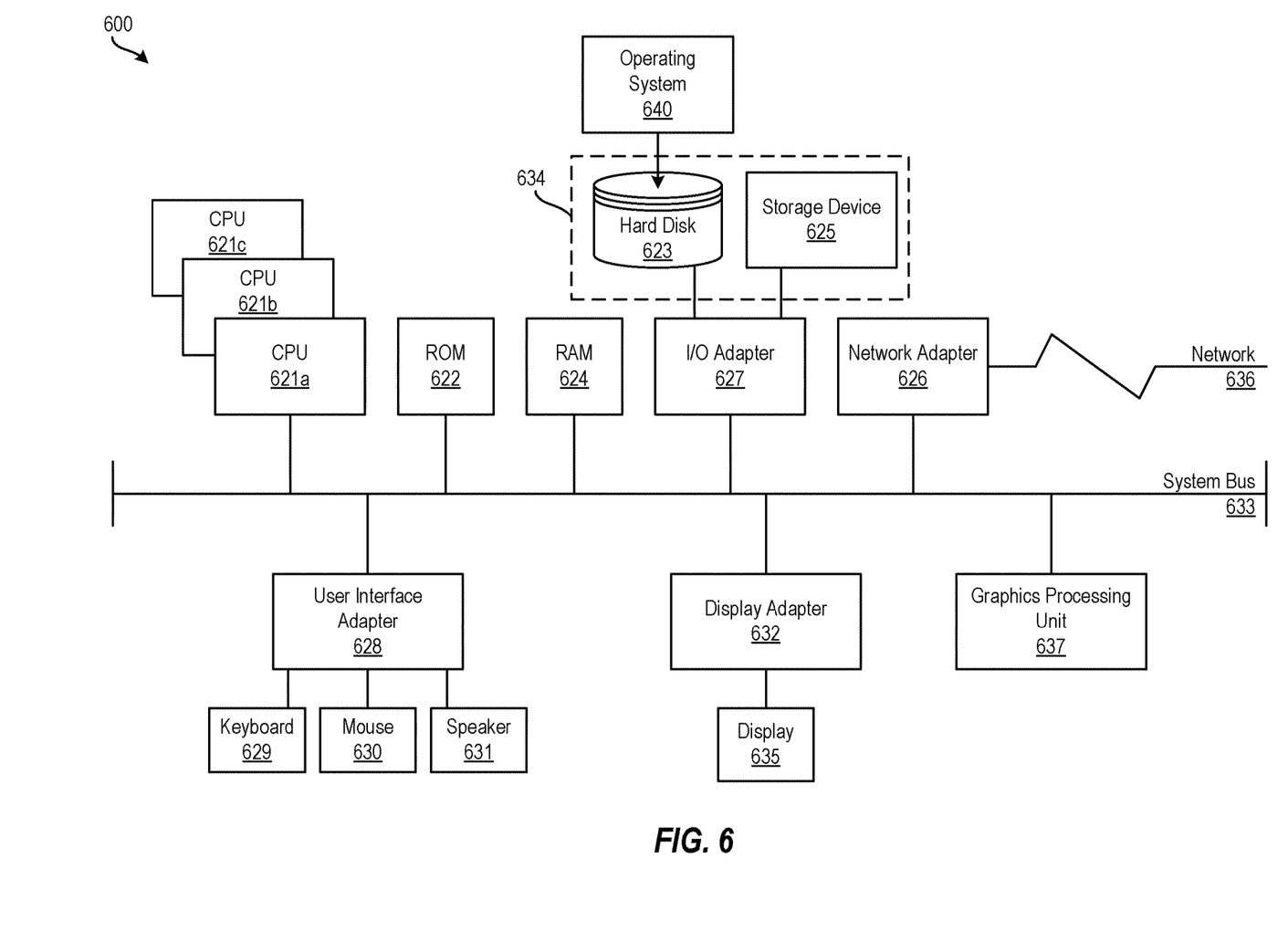
FIG. 6 depicts a block diagram of a processing system for implementing the presently described techniques according to one or more embodiments described herein.

It is understood that the present disclosure is capable of being implemented in conjunction with any other type of computing environment now known or later developed. For example, FIG. 6 depicts a block diagram of a processing system 600 for implementing the techniques described herein. In examples, processing system 600 has one or more central processing units (processors) 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of processing system 600.

Further depicted are an input/output (I/O) adapter 627 and a network adapter 626 coupled to system bus 633. I/O adapter 627 may be a small computer system interface (SCSI) adapter that communicates with a hard disk 623 and/or a storage device 625 or any other similar component. I/O adapter 627, hard disk 623, and storage device 625 are collectively referred to herein as mass storage 634. Operating system 640 for execution on processing system 600 may be stored in mass storage 634. The network adapter 626 interconnects system bus 633 with an outside network 636 enabling processing system 600 to communicate with other such systems.

A display (e.g., a display monitor) 635 is connected to system bus 633 by display adapter 632, which may include a graphics adapter to improve the performance of graphics intensive applications and a video controller. In one aspect of the present disclosure, adapters 626, 627, and/or 632 may be connected to one or more I/O busses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. A keyboard 629, mouse 630, and speaker 631 may be interconnected to system bus 633 via user interface adapter 628, which may include, for example, a Super I/O chip integrating multiple device adapters into a single integrated circuit.

In some aspects of the present disclosure, processing system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing, and has a highly parallel structure that makes it more effective than general-purpose CPUs for algorithms where processing of large blocks of data is done in parallel.

Thus, as configured herein, processing system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store the operating system 640 such as the AIX® operating system from IBM Corporation to coordinate the functions of the various components shown in processing system 600.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for providing random access to variable-length data, the method comprising:
    providing a layered index to variable length data, the layered index comprising a plurality of layers, the plurality of layers comprising an index array and a block offset array, wherein the index array is divided into a plurality of blocks, each of the plurality of blocks having a plurality of cells, each of the plurality of cells storing a value that identifies a next level index of a plurality of indices or data, wherein each of the plurality of indices represents a delta value that is a difference between a first index of one of the plurality of blocks and a shared integer size, and wherein the block offset array identifies a starting location of the index array;
    compressing the values stored in the plurality of cells of the index array on a per-block basis, wherein the values stored in the plurality of cells of one block of the plurality of blocks are compressed based on a maximum binary bit-length of values stored in the cells, other than a first cell, in the one block of the plurality of blocks to generate a compression value, wherein the maximum binary bit-length of values stored in the cells is determined based on a number of bits used to express a largest value stored in the cells of the one block of the plurality of blocks, and wherein the compression value is stored in a per-block size array; and
    performing a random access read of the variable length data using the layered index.

2. The computer-implemented method of claim 1, further comprising:

encoding the values stored in the index array using variable length index encoding based at least in part on the shared integer size.

3. The computer-implemented method of claim 2, wherein the shared integer size is a maximum binary bit-length of the values for a particular block.

4. The computer-implemented method of claim 3, wherein the shared integer size is constant for a particular block but varies across other blocks.

5. The computer-implemented method of claim 1, wherein a size of the plurality of blocks is fixed.

6. The computer-implemented method of claim 1, wherein performing the random access read of the variable length data comprises accessing the block offset array to determine a location in the index array associated with a location of particular data of the variable length data.

7. A system comprising:
a memory comprising computer readable instructions; and
a processing device for executing the computer readable instructions, the computer readable instructions controlling the processing device to perform operations comprising:
providing a layered index to variable length data, the layered index comprising a plurality of layers, the plurality of layers comprising an index array and a block offset array, wherein the index array is divided into a plurality of blocks, each of the plurality of blocks having a plurality of cells, each of the plurality of cells storing a value that identifies a next level index of a plurality of indices or data, wherein each of the plurality of indices represents a delta value that is a difference between a first index of one of the plurality of blocks and a shared integer size, and wherein the block offset array identifies a starting location of the index array;
compressing the values stored in the plurality of cells of the index array on a per-block basis, wherein the values stored in the plurality of cells of one block of the plurality of blocks are compressed based on a maximum binary bit-length of values stored in the cells, other than a first cell, in the one block of the plurality of blocks to generate a compression value, wherein the maximum binary bit-length of values stored in the cells is determined based on a number of bits used to express a largest value stored in the cells of the one block of the plurality of blocks, and wherein the compression value is stored in a per-block size array; and
performing a random access read of the variable length data using the layered index.

8. The system of claim 7, the operations further comprising:
encoding the values stored in the index array using variable length index encoding based at least in part on the shared integer size.

9. The system of claim 8, wherein the shared integer size is a maximum binary bit-length of the values for a particular block.

10. The system of claim 9, wherein the shared integer size is constant for a particular block but varies across other blocks.

11. The system of claim 7, wherein a size of the plurality of blocks is fixed.

12. The system of claim 7, wherein performing the random access read of the variable length data comprises accessing the block offset array to determine a location in the index array associated with a location of particular data of the variable length data.

13. A computer program product comprising a computer readable storage medium having program instructions embodied therewith, the program instructions executable by a processor to cause the processor to perform operations comprising:
providing a layered index to variable length data, the layered index comprising a plurality of layers, the plurality of layers comprising an index array and a block offset array, wherein the index array is divided into a plurality of blocks, each of the plurality of blocks having a plurality of cells, each of the plurality of cells storing a value that identifies a next level index of a plurality of indices or data, wherein each of the plurality of indices represents a delta value that is a difference between a first index of one of the plurality of blocks and a shared integer size, and wherein the block offset array identifies a starting location of the index array;
compressing the values stored in the plurality of cells of the index array on a per-block basis, wherein the values stored in the plurality of cells of one block of the plurality of blocks are compressed based on a maximum binary bit-length of values stored in the cells, other than a first cell, in the one block of the plurality of blocks to generate a compression value, wherein the maximum binary bit-length of values stored in the cells is determined based on a number of bits used to express a largest value stored in the cells of the one block of the plurality of blocks, and wherein the compression value is stored in a per-block size array; and
performing a random access read of the variable length data using the layered index.

14. The computer program product of claim 13, the operations further comprising:
encoding the values stored in the index array using variable length index encoding based at least in part on the shared integer size.

15. The computer program product of claim 14, wherein the shared integer size is a maximum binary bit-length of the values for a particular block.

16. The computer program product of claim 15, wherein the shared integer size is constant for a particular block but varies across other blocks.

17. The computer program product of claim 13, wherein a size of the plurality of blocks is fixed.

* * * * *